Feb. 20, 1923.
P. V. VERNON.
SAW FOR CUTTING METALS.
ORIGINAL FILED OCT. 30, 1919.
1,446,108.
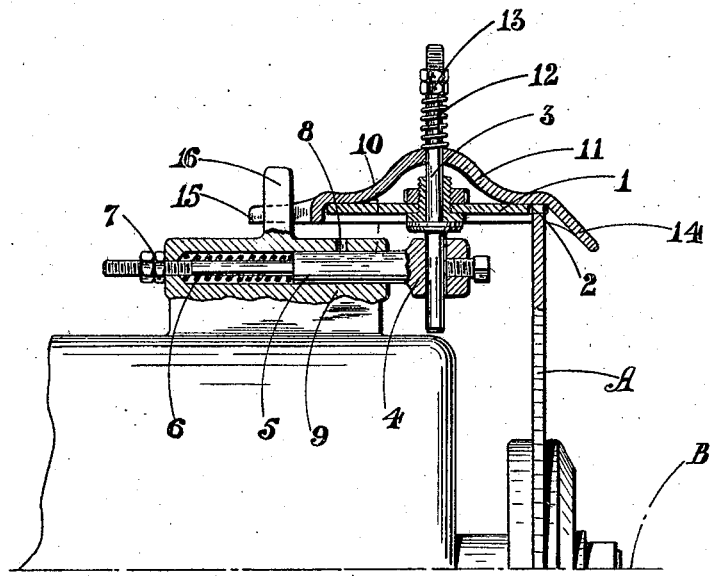
Fig.1.
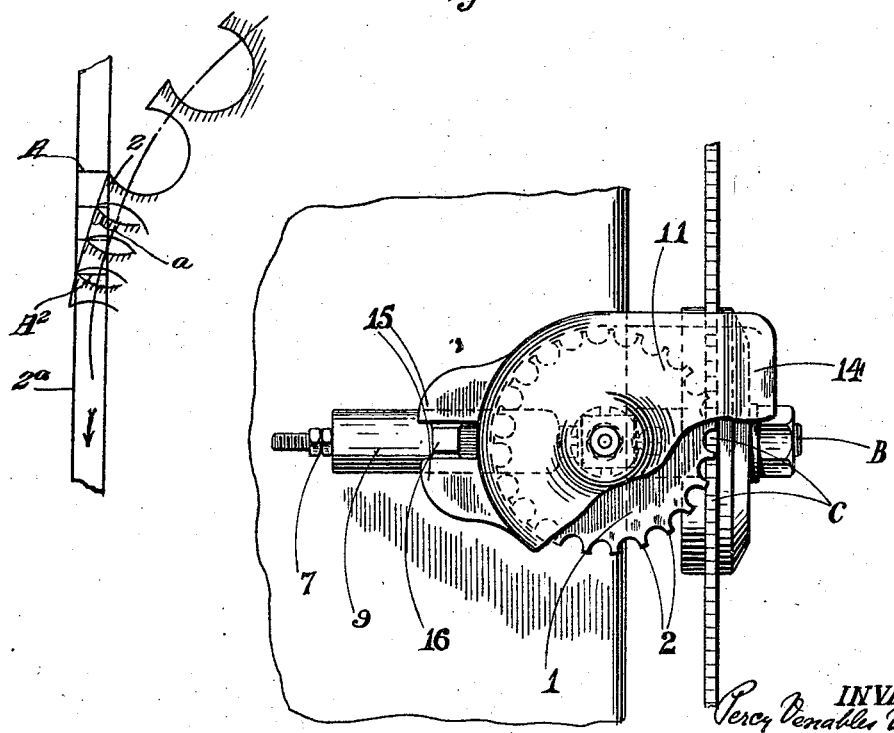
Fig.3.
Fig.2.
INVENTOR
Percy Venables Vernon
PER
ATTORNEY.

Patented Feb. 20, 1923.

1,446,108

UNITED STATES PATENT OFFICE.

PERCY VENABLES VERNON, OF KERESLEY, ENGLAND.

SAW FOR CUTTING METALS.

Original application filed October 30, 1919, Serial No. 334,505. Divided and this application filed March 3, 1921. Serial No. 449,507.

*To all whom it may concern:*

Be it known that I, PERCY VENABLES VERNON, a subject of the King of England, residing at Keresley, in the county of Warwick, England, have invented certain new and useful Improvements in Saws for Cutting Metals, of which the following is a specification.

This invention relates to saws for cutting metal, more particularly to those of the circular type, such as described in my application Ser. No. 334,505, filed Oct. 30, 1919, whereof this is a division and it has for its object to provide simple means whereby the metal chips, which adhere to the cutting teeth and reduce their cutting efficiency, may be removed.

According to this invention, this is effected by a rotating member in the form of a disc with radially projecting teeth around its periphery adapted to enter the spaces between the saw teeth and to move across or along the cutting faces of the teeth so as thereby to traverse such faces and to clear them of chips, the driving of the disc being effected by the saw through engagement of its teeth with those of the disc.

Means may be provided for applying to the disc a resiliently-acting braking effect to increase the pressure of contact of the engaging teeth, and the disc may be so mounted as to be displaceable against a yielding thrust to disengage the saw teeth if the spaces between the latter become choked.

The manner of carrying out the invention is illustrated in the accompanying drawings, in which—

Figure 1 is a sectional elevation, and

Figure 2 is a plan having a portion broken away for clearness.

Fig. 3 is a view drawn on an enlarged scale showing a portion of the chip-remover and the saw.

The saw is represented at A, the saw axis at B, and the saw teeth at C. The teeth-clearing device comprises a disc 1, preferably of case-hardened steel, and provided on its periphery with teeth 2 which advantageously may be of a shape substantially as indicated in Fig. 2, (i. e., formed by undercut notches in the rim of the disc, so that the points of the teeth are wider circumferentially than their shanks). The disc is mounted to rotate on an axle 3 which intersects the saw-axis B at any suitable angle, (preferably at a right angle) and its teeth 2 mesh with the saw-teeth C, so that the saw thereby causes it to rotate. The axle 3 is endwise adjustable in a boss 4 at the end of a plunger 5 parallel with the saw axis B and pressed by a spring 6 towards the saw A. Check nuts 7 are adapted to limit the movement of the plunger 5 towards the saw, and a feather 8 in the plunger guide 9 engages a featherway 10 in the plunger to prevent its rotation in the guide. Thus by means of the axle 3 the disc 1 can be positioned to suit various diameters of saws, and by means of the adjusting nuts 7 on the plunger 5, can have the depth of engagement of its teeth varied at will. The purpose of the spring 6 is to prevent damage if any jamming should accidentally occur.

A guard 11 is mounted on the axle 3 to cover the disc 1 and is pressed resiliently upon it to act as a brake by means of a spring 12 loaded by means of adjusting nuts 13 on the threaded axle 3. A downwardly directed lip 14 upon the guard 11 deflects the chips in a safe direction as they are discharged from the saw teeth. The braking action upon the disc is of importance in ensuring a dragging action of the disc teeth upon the faces of the saw teeth to clear the chips.

The spring 12 also allows the disc to lift if any chips should jam under the disc in the tooth spaces of the saw.

Rotation of the guard 11 with the disc 1 is prevented by the provision on the former of jaws 15, which engage a projection 16 on the plunger guide 9, the depth of the jaws allowing for any endwise movement of the plunger 5.

The undercut portions of the chip remover and the relative positions of its teeth and the teeth of the saw are clearly shown in the enlarged view of Fig. 3. In that figure, the point of one tooth 2 of the chip remover is shown as commencing to engage with a saw tooth A, while the point of another tooth $2^a$ is just leaving the saw tooth $A^2$. Between the teeth A, $A^2$ of the saw are shown intermediate positions of the saw teeth and corresponding intermediate positions of the teeth 2 of the chip remover, whereby the scraping action of the points of the teeth as they move progressively across the saw teeth is made clear, and it becomes obvious why the undercutting of the teeth 2, $2^a$ is essential. Without this undercutting the flanks of the teeth would bear on the edges of the saw teeth so that the acting edges which effect the scraping would be lifted off the teeth, and thus would fail to remove the chips. Furthermore, it will be evident that the undercutting gives a more favorable scraping angle (angle $a$) for the point of the tooth.

The invention is obviously applicable to band and other types of saw and is not restricted in its application to circular saws only.

What I claim as my invention and desire to secure by Letters Patent of the United States is:—

1. In a device for removing chips from metal-cutting saws, the combination with the saw, of a rotatable disc having along its periphery radially disposed teeth adapted to enter and traverse the spaces between the saw teeth, and to be driven by them.

2. In a device for removing chips from metal-cutting saws, the combination with the saw, of a rotatable disc having along its periphery radially disposed teeth with their points circumferentially wider than their shanks, the said teeth being adapted to enter the spaces between the teeth of the said saw so as to traverse them and be driven thereby.

3. In a device for removing chips from metal-cutting saws, the combination with the saw, of a rotatable disc having along its periphery radially disposed teeth adapted to enter the spaces between the saw teeth, an axle carrying said disc, and a member yieldingly thrust towards the plane of said saw and carrying said disc axle in such manner that said disc teeth traverse the faces of said saw teeth and are driven by them.

4. In a device for removing chips from metal-cutting saws, the combination with the saw, of a disc having along its periphery radially disposed teeth adapted to enter the spaces between the teeth of said saw to traverse the faces of said teeth and to be driven by them, and a brake resiliently applied to said disc to resist its rotational movement.

5. In a device for removing chips from metal-cutting saws, the combination with the saw, of a disc having along its periphery radially disposed teeth adapted to enter the spaces between the teeth of said saw to traverse the faces of said teeth and to be driven by them, a guard adapted to bear against one side of said disc and provided with a lip adjacent the engaging teeth of said disc and said saw to guide the path of the chips removed, a spring adjustably loaded to thrust said guard against said disc thereby to resist its rotational movement, and means for preventing said guard rotating with said disc.

6. In a device for removing chips from metal-cutting saws, the combination with a circular saw, of a disc mounted to rotate about an axis transverse to that of the saw, radially disposed teeth along the periphery of said disc, undercut from their tips towards their roots on their acting sides, which teeth are adapted to enter the spaces between the saw teeth to traverse the faces of said teeth and to be driven by them, an axle endwise adjustable to or from the saw centre, carrying said disc, a plunger carrying said axle and movable endwise to or from the saw plane but resiliently thrust towards the saw, a guard carried by said disc axle, a spring carried by said axle to bear upon said guard, an adjustable abutment for said spring carried by said axle thereby to cause resilient pressure of said guard upon said disc, means for preventing rotation of said guard with said disc, and a lip formed on said guard adjacent the engaged teeth of said disc and said saw.

7. The combination of a circular saw having teeth and having gullets between the teeth; and a rotating chip remover located at one side of the saw, having arms extending into the gullets so that as the remover is rotated by the saw it will push the chips from the gullets.

8. The combination in a chip remover for saws, of a circular saw having teeth; gullets between the teeth and having a chip remover in the form of a rotating device having arms; a stud on which the device is mounted so as to turn freely; and a bracket carrying the stud, said stud being adjustable on the bracket towards and from the saw.

9. A chip remover for saws having a series of arms arranged to be located at one side of the saw in such position that the arms will enter the gullets of the saw between the teeth and push the chips laterally therefrom, the teeth of the saw acting upon the arms to rotate the remover.

In testimony whereof I have signed my name to this specification in the presence of two subscribing witnesses.

PERCY VENABLES VERNON.

Witnesses:
C. CLARKSON,
H. F. HARRISON.